United States Patent
Mutnuru (10) Patent No.: US 12,231,294 B2
(45) Date of Patent: Feb. 18, 2025

(54) SYSTEM AND METHOD FOR USE OF DYNAMIC TEMPLATES WITH A NETWORK TRAFFIC FLOW INFORMATION PROTOCOL

(71) Applicant: ORACLE INTERNATIONAL CORPORATION, Redwood Shores, CA (US)

(72) Inventor: Rishi Mutnuru, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/569,431

(22) Filed: Sep. 12, 2019

(65) Prior Publication Data

US 2021/0083941 A1 Mar. 18, 2021

(51) Int. Cl.
| | |
|---|---|
| H04L 41/0896 | (2022.01) |
| H04L 41/0853 | (2022.01) |
| H04L 41/5041 | (2022.01) |
| H04L 43/026 | (2022.01) |
| H04L 47/2483 | (2022.01) |

(52) U.S. Cl.
CPC ...... *H04L 41/0896* (2013.01); *H04L 41/0853* (2013.01); *H04L 41/5048* (2013.01); *H04L 43/026* (2013.01); *H04L 47/2483* (2013.01)

(58) Field of Classification Search
CPC ............ H04L 41/0896; H04L 41/0853; H04L 41/5048; H04L 43/026; H04L 47/2483
See application file for complete search history.

(56) References Cited

U.S. PATENT DOCUMENTS

| | | | |
|---|---|---|---|
| 2014/0303934 A1* | 10/2014 | Mylarappa | G06F 11/00 702/186 |
| 2016/0277272 A1* | 9/2016 | Peach | H04L 43/0858 |
| 2016/0359728 A1* | 12/2016 | Ficara | H04L 45/033 |

(Continued)

OTHER PUBLICATIONS

Claise et al., Specification of the IP Flow Information Export (IPFIX) Protocol for the Exchange of Flow Information, Sep. 2013), hjp.at (Year: 2013).*

(Continued)

*Primary Examiner* — Oleg Survillo
*Assistant Examiner* — Abdelbasst Talioua
(74) *Attorney, Agent, or Firm* — TUCKER ELLIS LLP (57) ABSTRACT

In accordance with an embodiment, described herein is a system and method for use of dynamic templates with a network traffic flow information protocol, such as, for example, an Internet Protocol Flow Information Export (IPFIX) protocol. An exporter, that operates an exporting process, generates a capability message that indicates the network traffic flow fields that can be implemented and exported from the exporter (e.g., in an IPFIX data format), and communicates the capability message to a collector that operates a collecting process. The collector examines the network traffic flow fields identified by the capability message, and generates a dynamic template request message indicating (in the manner of a virtual template) a combination of fields for which network traffic flow information is to be provided. The exporter thereafter communicates, to the collector, data messages comprising the network traffic flow fields as indicated by the dynamic template.

19 Claims, 8 Drawing Sheets

(56) References Cited

U.S. PATENT DOCUMENTS

| | | | |
|---|---|---|---|
| 2017/0093681 A1* | 3/2017 | Chaubey | H04L 41/0806 |
| 2017/0244606 A1* | 8/2017 | Htay | H04L 41/40 |
| 2020/0366578 A1* | 11/2020 | Punj | H04L 43/028 |
| 2021/0029166 A1* | 1/2021 | Krishna | G06N 20/00 |

OTHER PUBLICATIONS

Claise et al., Specification of the IP Flow Information Export (IPFIX) Protocol for the Exchange of Flow Information, Sep. 2013 (Year: 2013).*

"Specification of the IP Flow Information Export (IPFIX) Protocol for the Exchange of Flow Information", published by the Internet Engineering Task Force (IETF) as Request for Comments (RFC) 7011 on Sep. 2013; retrieved from https://tools.ietf.org/pdf/rfc7011.pdf on Sep. 12, 2019; 76 pages.

Junos OS "Logging and Reporting Function for Subscribers"; retrieved on Dec. 28, 2009 from: <https://www.juniper.net/documentation/en_US/junos/topics/concept/tdf-lrf-subscribers-overview.html> , 9 pages.

Wikipedia "IP Flow Information Expert"; retrieved Jul. 11, 2019 from: <https://en.wikipedia.org/wiki/IP_Flow_Information_Export> , 4 pages.

Wikipedia "OSI model"; retrieved Jul. 11, 2019 from: <https://en.wikipedia.org/wiki/OSI_model> , 6 pages.

Claise, B., Ed., "Specification of the IP Flow Information Export (IPFIX) Protocol for the Exchange of IP Traffic Flow Information", RFC 5101, DOI 10.17487/RFC5101, Jan. 2008, <https://www.rfc-editor.org/info/rfc5101> , 63 pages.

Claise, B., Ed., Trammell, B., Ed., and P. Aitken, "Specification of the IP Flow Information Export (IPFIX) Protocol for the Exchange of Flow Information", STD 77, RFC 7011, DOI 10.17487/RFC7011, Sep. 2013, <https://www.rfc-editor.org/info/rfc7011> , 76 pages.

* cited by examiner

| Dynamic Template Data Message 216 (Data Set) | |
|---|---|
| SetID = Template ID (61440 - 65535) | Field Count |
| Record 1 - Field Value 1 | Record 1 - Field Value 2 |
| Record 1 - Field Value 3 | ... |
| Record 2 - Field Value 1 | Record 2 - Field Value 2 |
| Record 2 - Field Value 3 | ... |
| Record 3 - Field Value 1 | Record 3 - Field Value 2 |
| Record 3 - Field Value 3 | ... |
| ... | Padding (optional) |

SYSTEM AND METHOD FOR USE OF DYNAMIC TEMPLATES WITH A NETWORK TRAFFIC FLOW INFORMATION PROTOCOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer network environments, and techniques for network traffic monitoring and management, network analytics, logging and/or reporting, and are particularly related to systems and methods for use of dynamic templates with a network traffic flow information protocol, such as, for example, an Internet Protocol Flow Information Export (IPFIX) protocol.

BACKGROUND

Computer network environments, including for example cloud computing environments, generally support the use of a network traffic flow information protocol, to provide a means of exporting or otherwise communicating network traffic flow information, from various network devices such as routers, firewalls, probes, or other devices provided within the network, for use in monitoring and management of such devices.

For example, the Internet Protocol Flow Information Export (IPFIX) protocol, protocol, as described in the "Specification of the IP Flow Information Export (IPFIX) Protocol for the Exchange of Flow Information", published by the Internet Engineering Task Force (IETF) as Request for Comments (RFC) 7011 on September 2013, which is herein incorporated by reference, defines a protocol by which Internet Protocol (IP) network traffic flow information can be formatted and communicated from an exporter device (exporter) to a collector device (collector).

Generally described, with such a network traffic flow information protocol, a set of data packets describing the network traffic flow are collected at one or more observation points within an observation domain. The exporter operates an exporting process that sends the data packets to a collector that operates a collecting process. Each of the exporters and collectors can operate in a many-to-many relationship, i.e., an exporter can send data packets to many collectors; and a collector can receive data packets from many exporters.

Network device manufacturers can use a network traffic flow information protocol such as IPFIX to export network traffic flow information associated with the use of their network devices within various L4-L7 network layers; wherein L4 is generally understood to represent a transport layer; L5 a session layer; L6 a presentation layer; and L7 an application layer.

For example, a router may be adapted to export Domain Name System (DNS), Transmission Control Protocol (TCP), HyperText Transfer Protocol (HTTP), or other network traffic flow information associated with the use of the device or applications operating within the network; each of which types of traffic flow information can be used in calculating various analytics or metrics, monitoring, managing, or troubleshooting the network environment.

To support the communication or export of network traffic flow information from various different network devices, templates can be pre-defined on each exporter and each collector, which then controls the sending of data packets to those collectors, based on a configured policy.

However, since each exporter and collector may have different capabilities, it can be a burden to configure each exporter with potentially several different pre-defined templates for use with several different collectors, and then export data packets to those several different collectors accordingly.

Additionally, in a large network environment, such as for example a cloud computing environment, the requirement for pre-defined templates means that each pre-defined template is essentially fixed, and must either be finely tuned for its intended purpose, which limits the types of flow information it provides; or alternatively be defined broadly to encompass a wide variety of flow information, which results in the amount of data being transferred between exporters and collectors increasing dramatically.

These are some examples of the computing environments and technical areas that various embodiments described herein can be used to address.

SUMMARY

In accordance with an embodiment, described herein is a system and method for use of dynamic templates with a network traffic flow information protocol, such as, for example, an Internet Protocol Flow Information Export (IPFIX) protocol. An exporter, that operates an exporting process, generates a capability message that indicates the network traffic flow fields that can be implemented and exported from the exporter (e.g., in an IPFIX data format), and communicates the capability message to a collector that operates a collecting process. The collector examines the network traffic flow fields identified by the capability message, and generates a dynamic template request message indicating (in the manner of a virtual template) a combination of fields for which network traffic flow information is to be provided. The exporter thereafter communicates, to the collector, data messages comprising the network traffic flow fields as indicated by the dynamic template.

DETAILED DESCRIPTION

As described above, computer network environments, including for example cloud computing environments, generally support the use of a network traffic flow information protocol, to provide a means of exporting or otherwise communicating network traffic flow information, from various network devices such as routers, firewalls, probes, or other devices provided within the network, for use in monitoring and management of such devices. For example, the Internet Protocol Flow Information Export (IPFIX) protocol defines a protocol by which Internet Protocol (IP) network traffic flow information can be formatted and communicated from an exporter device (exporter) to a collector device (collector).

However, since each exporter and collector may have different capabilities, it can be a burden to configure each exporter with potentially several different pre-defined templates for use with several different collectors, and then export data packets to those several different collectors accordingly.

In accordance with an embodiment, described herein is a system and method for use of dynamic templates with a network traffic flow information protocol, such as, for example, an IPFIX protocol.

An exporter, that operates an exporting process, generates a capability message that indicates the network traffic flow fields that can be implemented and exported from the exporter (e.g., in an IPFIX data format), and communicates the capability message to a collector that operates a collecting process.

The collector examines the network traffic flow fields identified by the capability message, and generates a dynamic template request message indicating (in the manner of a virtual template) a combination of fields for which network traffic flow information is to be provided.

The exporter thereafter communicates, to the collector, data messages comprising the network traffic flow fields as indicated by the dynamic template.

In accordance with an embodiment, the described approach provides a technical improvement in that only that data describing network traffic flow information which is absolutely required by the dynamic template, needs to be exported by the exporter, and communicated to the collector, which provides savings both in terms of data processing, storage, and bandwidth usage. Each collector can process the data that it exactly needs, with no processing and storing of redundant data.

In accordance with various embodiments, additional advantages of the systems and methods described herein include that the approach avoids having to configure pre-defined templates for use with various exporters and/or collectors. This simplifies the management of multiple exporters and multiple collectors in a complex data center, for example one providing a cloud computing environment.

In accordance with an embodiment, the described approach, including the use of a dynamic template, can be provided by way of an extension to a network traffic flow information protocol, such as, for example, an IPFIX protocol, and can incorporate or utilize various features of the IPFIX protocol as illustrated below. Other embodiments can be used with other types of network traffic flow information protocol.

Observation Point

In accordance with an embodiment, an observation point is a location in the network where network traffic flow can be observed, e.g., a port of a router device. An observation domain is a collection of observation points for which network traffic flow information can be aggregated by a metering process.

Network Traffic Flow (Flow)

In accordance with an embodiment, a network traffic flow is a set of packets or frames passing an observation point within a particular time interval.

Flow Record

In accordance with an embodiment, a flow record includes information describing a particular network traffic flow that was observed at an observation point. A flow record can include measured properties of the flow (e.g., the total number of bytes), or characteristic properties of the flow (e.g., a source IP address).

Metering Process

In accordance with an embodiment, a metering process generates flow records.

Exporter Device (Exporter)

In accordance with an embodiment, an exporter device, generally referred to herein as an exporter, is a computer or other electronic device having a processor that hosts one or more exporting processes.

Exporting Process

In accordance with an embodiment, an exporting process sends network traffic flow information protocol messages (e.g., IPFIX messages) to one or more collecting processes.

Collector Device (Collector)

In accordance with an embodiment, a collector device, generally referred to herein as a collector, is a computer or other electronic device having a processor that hosts one or more collecting processes.

Collecting Process

In accordance with an embodiment, a collecting process receives network traffic flow information protocol messages (e.g., IPFIX messages) from one or more exporting processes.

Template

In accordance with an embodiment, a template is an ordered sequence of <type, length> pairs that are used to specify the structure and semantics of a particular set of network traffic flow information to be communicated from an exporter to a collector.

Template Record

In accordance with an embodiment, a template record defines the structure and interpretation of fields in a data record.

Network Traffic Flow Information Message

In accordance with an embodiment, a network traffic flow information message (e.g., an IPFIX message) is a message that originates at the exporting process and carries data records of this exporting process to a collecting process.

Message Header

In accordance with an embodiment, a message header is the first part of a network traffic flow information message (e.g., an IPFIX message), and provides basic information about the message, such as the protocol version, length of the message, or message sequence number.

Data Record

In accordance with an embodiment, a data record is a record that indicates values of the parameters corresponding to a template record.

Set

In accordance with an embodiment, a set is a collection of records that have a similar structure, prefixed by a header.

Figure 1:
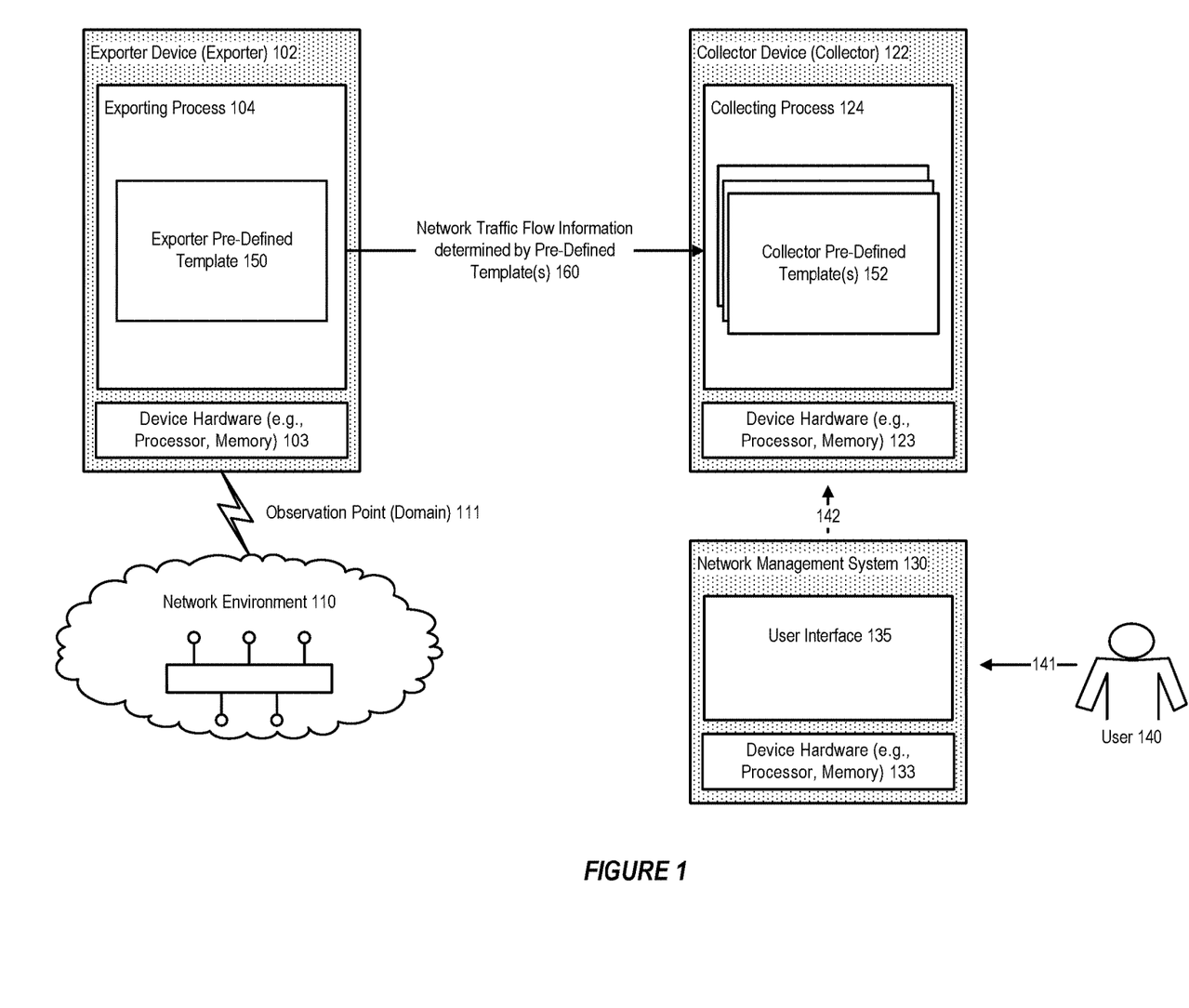
FIG. 1 illustrates a system for use with a network traffic flow information protocol, in accordance with an embodiment.

FIG. 1 illustrates a system for use with a network traffic flow information protocol, in accordance with an embodiment.

As illustrated in FIG. 1, in accordance with an embodiment, an exporting process 104 adapted to communicate network traffic flow information (e.g., in an IPFIX data format) associated with a computer network environment, to a collecting process, can be provided at a computer or other electronic device operating as an exporter device (exporter) 102, having a device hardware (e.g., processor, memory) 103.

In accordance with an embodiment, the collecting process 124 adapted to receive the network traffic flow information from the exporter, can be provided at a computer or other electronic device operating as a collector device (collector) 122, having a device hardware (e.g., processor, memory) 123.

In accordance with an embodiment, using the network traffic flow information protocol, a set of data packets describing the network traffic flow associated with a network environment 110 are collected at one or more observation points 111 within an observation domain.

As described above, to support the communication or export of network traffic flow information from various different network devices, pre-defined templates 150, 152 can be pre-defined on each exporter and each collector, which then controls the sending of network traffic flow information as determined by those pre-defined templates 160.

In such an environment, a network management system 130 having a device hardware (e.g., processor, memory) 133 and user interface 135 can allow a user 140 to interact with 141, or otherwise access 142 the network flow information, for purposes of network traffic monitoring and management, network analytics, logging and/or reporting.

However, as described above, since each exporter and collector may have different capabilities, it can be a burden to configure each exporter with potentially several different pre-defined templates for use with several different collectors, and then export data packets to those several different collectors accordingly.

Dynamic Templates

Figure 2:
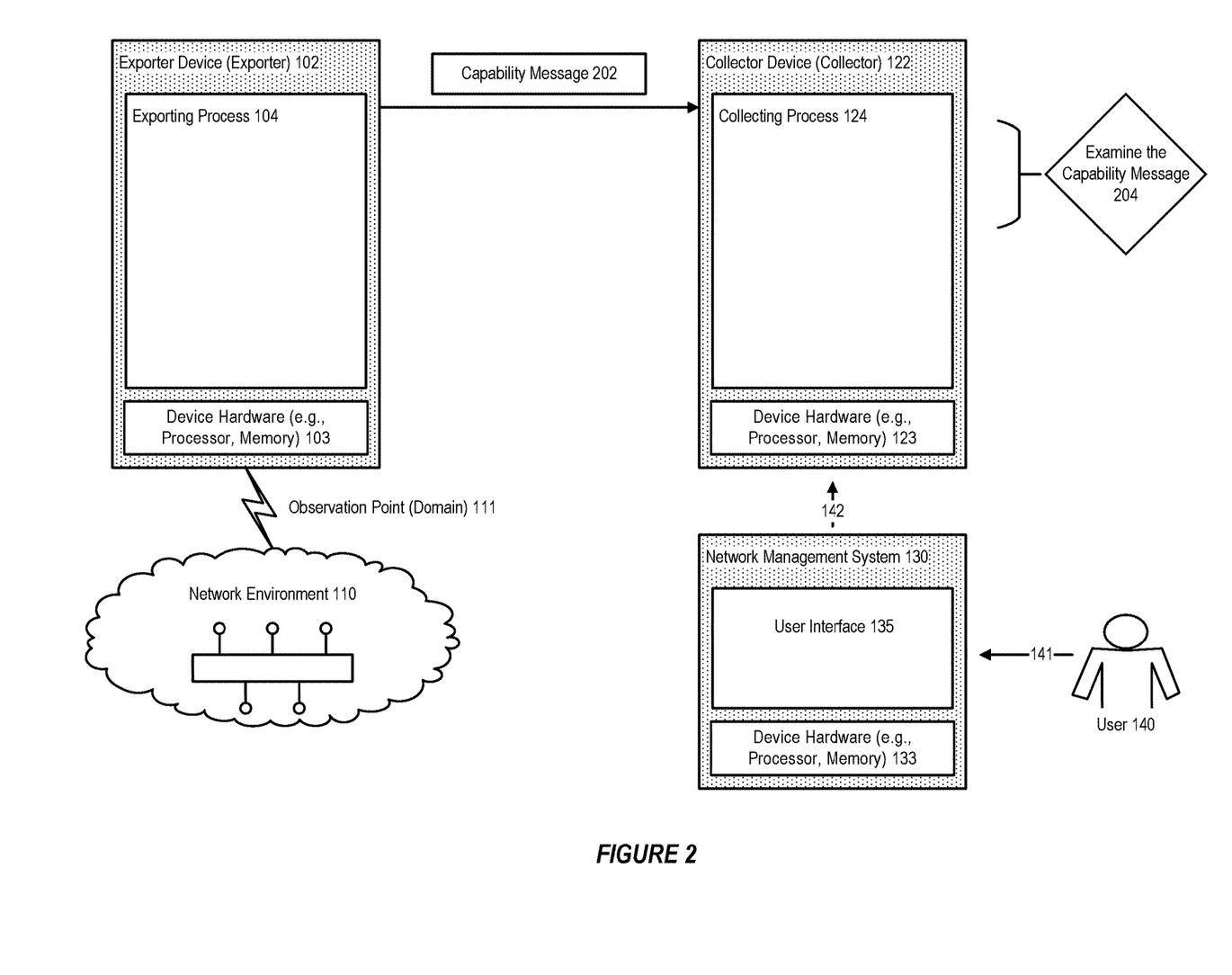
FIG. 2 illustrates a system for use of dynamic templates with a network traffic flow information protocol, in accordance with an embodiment.

FIG. 2 illustrates a system for use of dynamic templates with a network traffic flow information protocol, in accordance with an embodiment.

As illustrated in FIG. 2, in accordance with an embodiment, to address the above limitations, the system can employ the use of dynamic templates with a network traffic flow information protocol, such as, for example, an IPFIX protocol.

In accordance with an embodiment, the exporter generates a capability message 202 that indicates the network traffic flow fields (e.g., in an IPFIX data format) that can be implemented and exported from the exporter, and communicates the capability message to the collector.

In accordance with an embodiment, the collector, upon receipt of the capability message from the exporter, examines 204 the network traffic flow fields identified therein, for use in generating 206 a dynamic template request message.

For example, in accordance with an embodiment, the collector can receive the capability message, and determine either those types of metrics the collector has the capability to handle; or those types of metrics it is desired to handle, based on input from the user; and then report that information back to the exporter.

In accordance with an embodiment, the collector uses the User Datagram Protocol (UDP) port number specified in the first message from the exporter as the destination UDP port to reach the exporter.

Figure 3:
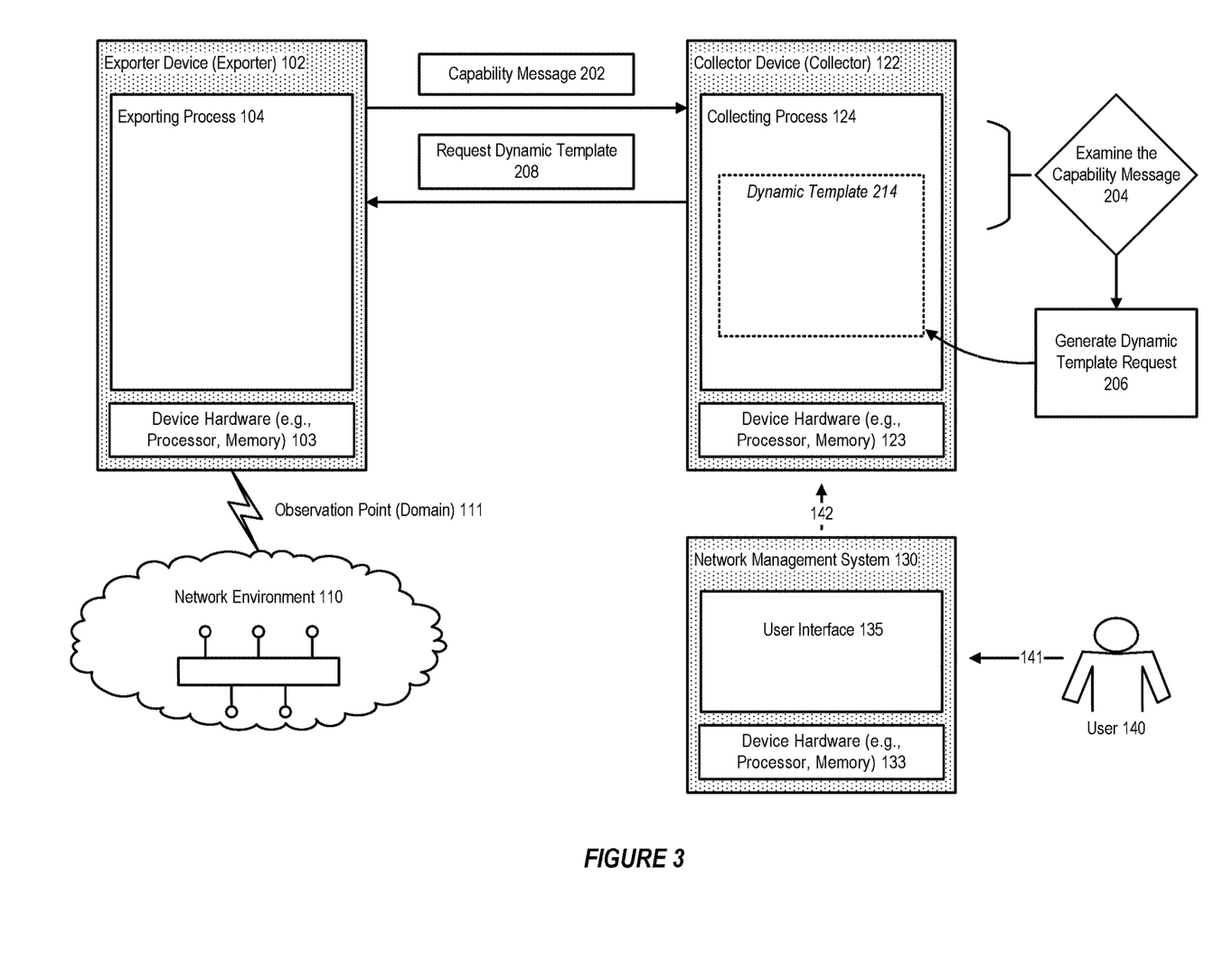
FIG. 3 further illustrates a system for use of dynamic templates with a network traffic flow information protocol, in accordance with an embodiment.

FIG. 3 further illustrates a system for use of dynamic templates with a network traffic flow information protocol, in accordance with an embodiment.

As illustrated in FIG. 3, in accordance with an embodiment, the dynamic template request message 208 indicating a combination of fields for which network traffic flow information is to be provided, is communicated to the exporter.

Figure 4:
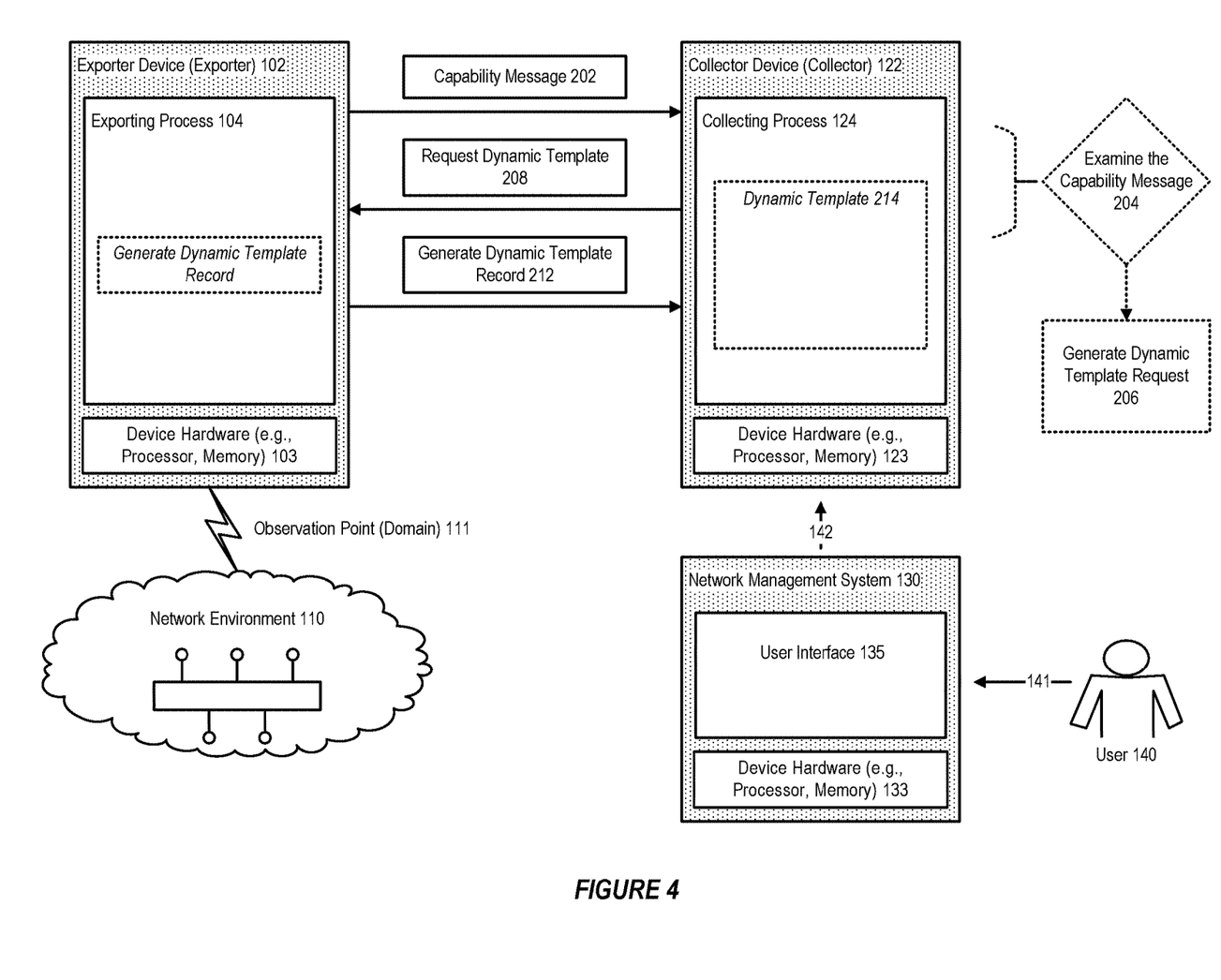
FIG. 4 further illustrates a system for use of dynamic templates with a network traffic flow information protocol, in accordance with an embodiment.

FIG. 4 further illustrates a system for use of dynamic templates with a network traffic flow information protocol, in accordance with an embodiment.

As illustrated in FIG. 4, in accordance with an embodiment, the exporter can communicate, to the collector, based on a configured trigger, a dynamic template record (data record) 212, and dynamic template data messages comprising the network traffic flow fields as indicated by the dynamic template 214.

Figure 5:
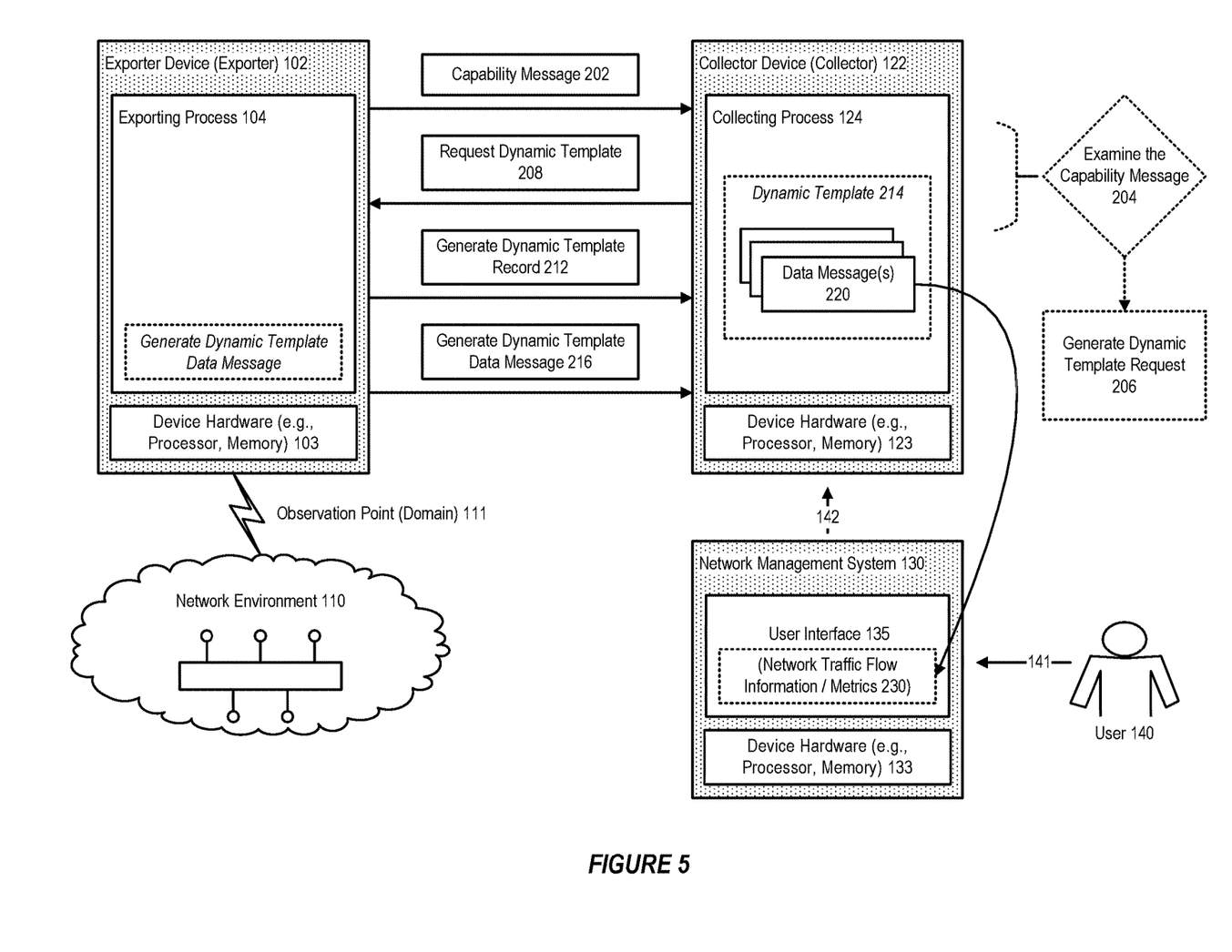
FIG. 5 further illustrates a system for use of dynamic templates with a network traffic flow information protocol, in accordance with an embodiment.

FIG. 5 further illustrates a system for use of dynamic templates with a network traffic flow information protocol, in accordance with an embodiment.

As illustrated in FIG. 5, in accordance with an embodiment, the collector receives the data messages 216, 220, as defined by the dynamic template, for use in determining a network traffic flow information or other metrics associated with the computer network environment.

For example, as described above, in accordance with an embodiment, a network management system having a user interface can allow a user to interact with, or otherwise access the network flow information, for purposes of network traffic monitoring and management, network analytics, logging and/or reporting, including, for example network traffic flow information or metrics 230 as provided by the collected data messages.

Capability Message

Figure 6:
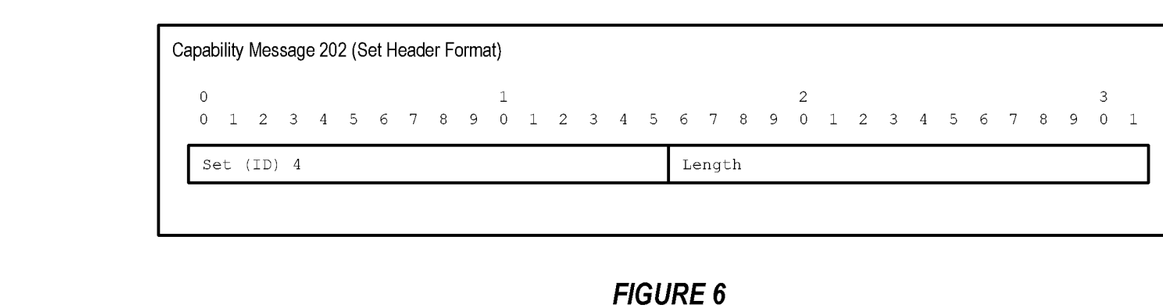
FIG. 6 illustrates an example of a capability messages (set header format), for use with a network traffic flow information protocol, and dynamic templates, in accordance with an embodiment.

FIG. 6 illustrates an example of a capability messages 202 (set header format), for use with a network traffic flow information protocol, and dynamic templates, in accordance with an embodiment.

As illustrated in FIG. 6, in accordance with an embodiment, the set header in the IPFIX message has records types which will be template records, options template records, or data records. To support the use of dynamic templates, a new capability template record type and request control template record type can be added.

In accordance with an embodiment, every set contains a common header. The set header field definitions are as follows:

Set ID: A set identifier (set ID) value identifies the set. A value of 2 is reserved for the template set. A value of 3 is reserved for the option template set. All other values from 4 to 255 are reserved for future use. Values above 255 are used for data sets. The set ID values of 0 and 1 are not used for historical reasons.

Length: The total length of the set, in octets, including the set header, all records, and the optional padding. Since an individual set may contain multiple records, the length value must be used to determine the position of the next set.

In accordance with an embodiment, a set ID value of 4 is reserved for the capability templates. The length will be the length of the capability fields exported over the template.

Request Control Template Message

In accordance with an embodiment, upon receiving the capability message from the exporter, a request control message is sent from the collectors to the exporters. A request control template can be similar to template record format, and contains all the fields with their enterprise number value which are of interest to the particular collector. The process can then include:

The collector sends the request control template to message to the exporter.

The collector uses a set ID value of 5 for requesting the control template. It fills the field value and enterprise values it obtained from the capability message and sends this message to the exporter.

In accordance with an embodiment, only one dynamic control template message per collector is allowed. Subsequent message from the collector will override the control template for this collector in the exporter.

Dynamic Template Record Message

Figure 7:
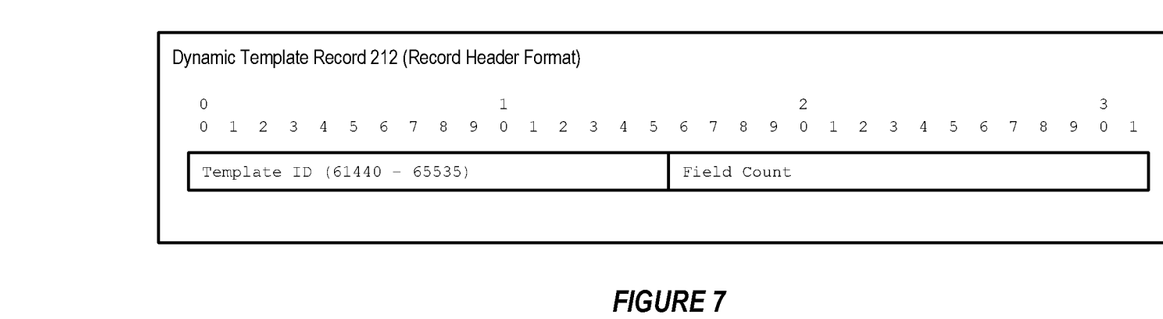
FIG. 7 illustrates an example of a dynamic template record (record header format), for use with a network traffic flow information protocol, and dynamic templates, in accordance with an embodiment.

FIG. 7 illustrates an example of a dynamic template record 212 (record header format), for use with a network traffic flow information protocol, and dynamic templates, in accordance with an embodiment.

As illustrated in FIG. 7, in accordance with an embodiment, the exporter sends this message in response to the request control message from the collector. This message is similar to a template record message. A template identifier (template ID) value in the range of 61440 through 65535 is dedicated for dynamic templates. This helps to ensure that these template IDs are not conflicting with any configured template IDs (if any), and indicates to the collector that this template is dynamically generated.

Dynamic Template Data Message

Figure 8:
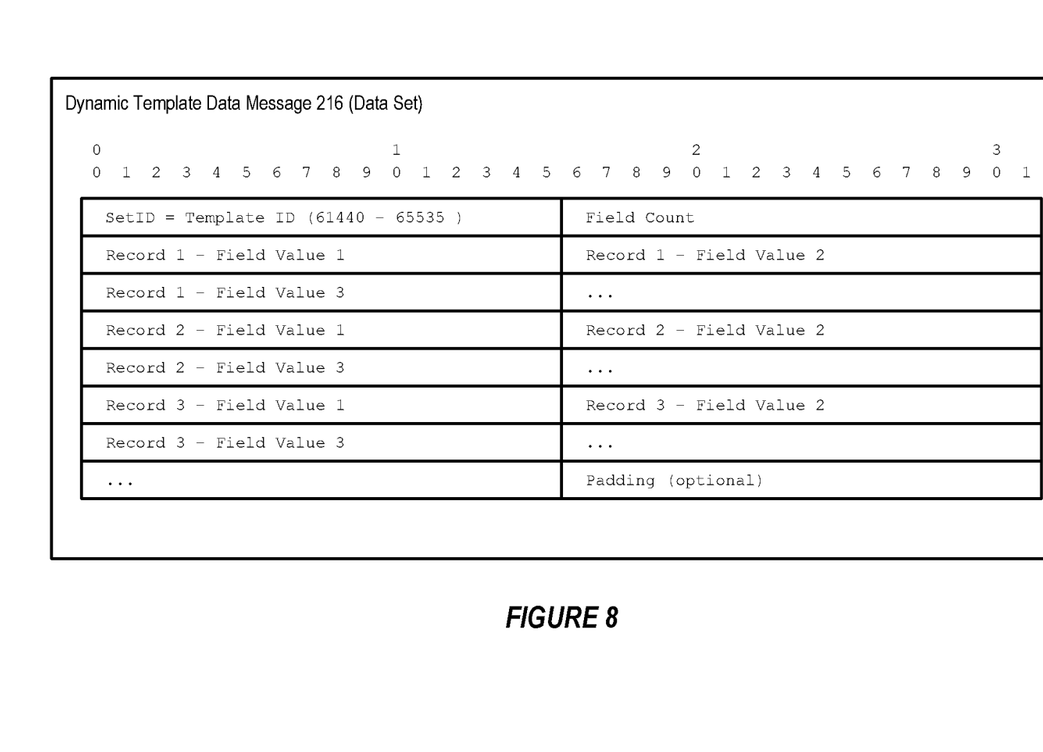
FIG. 8 illustrates an example of a dynamic template data message (data set), for use with a network traffic flow information protocol, and dynamic templates, in accordance with an embodiment.

FIG. 8 illustrates an example of a dynamic template data message 216 (data set), for use with a network traffic flow information protocol, and dynamic templates, in accordance with an embodiment.

As illustrated in FIG. 8, in accordance with an embodiment, the dynamic template data message can be sent from an exporter to a collector based on the trigger configured on the exporter. A set ID value in the set header in the range 61440 through 65535 can be used which matches the template ID used for the dynamic template.

Use of Dynamic Templates to Provide Network Traffic Flow Information

Figure 9:
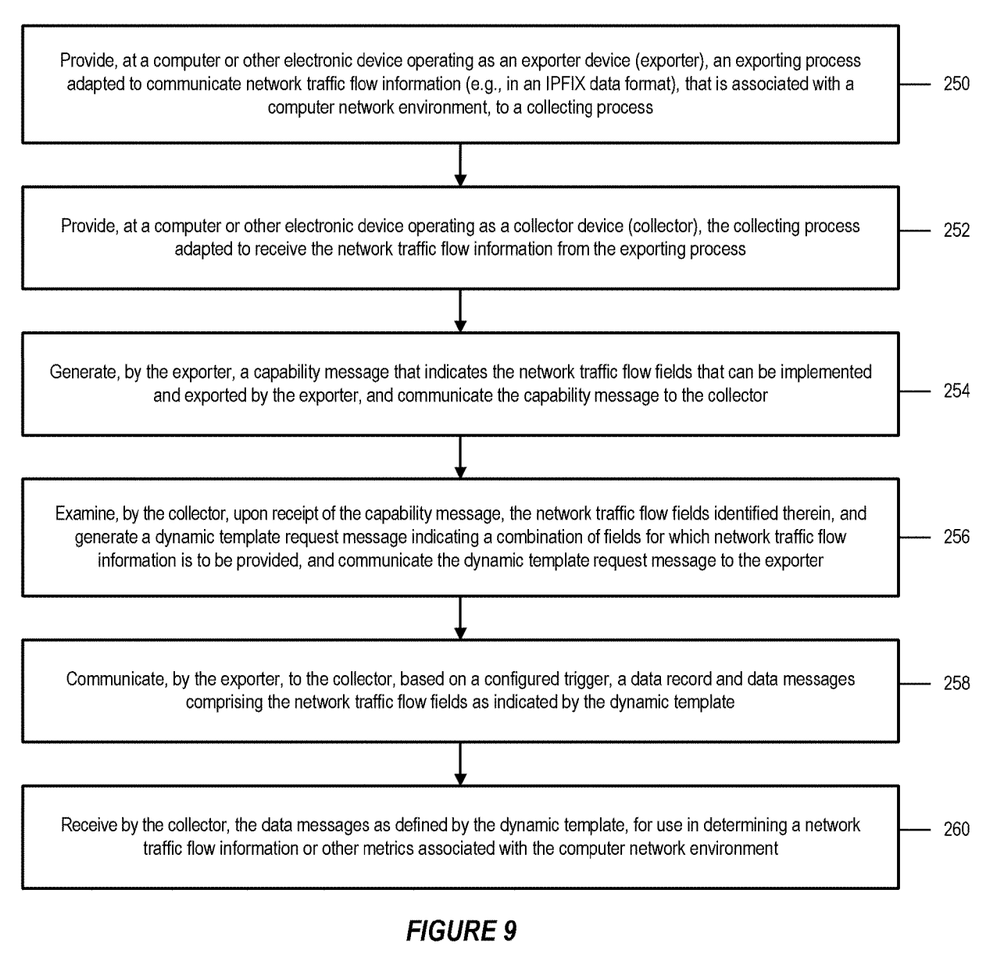
FIG. 9 illustrates a method performed by an exporter device, that operates an exporting process, and a collector device, that operates a collecting process, for use with a network traffic flow information protocol, and dynamic templates, in accordance with an embodiment.

FIG. 9 illustrates a method performed by an exporter device, that operates an exporting process, and a collector device, that operates a collecting process, for use with a network traffic flow information protocol, and dynamic templates, in accordance with an embodiment.

As illustrated in FIG. 9, in accordance with an embodiment, at step 250, an exporting process adapted to communicate network traffic flow information (e.g., in an IPFIX data format) associated with a computer network environment, to a collecting process, can be provided at a computer or other electronic device operating as an exporter device (exporter).

At step 252, the collecting process adapted to receive the network traffic flow information from the exporter, can be provided at a computer or other electronic device operating as a collector device (collector).

At step 254, the exporter generates a capability message that indicates the network traffic flow fields (e.g., in an IPFIX data format) that can be implemented and exported from the exporter, and communicates the capability message to the collector.

At step 256, the collector, upon receipt of the capability message from the exporter, examines the network traffic flow fields identified therein, and generates a dynamic template request message indicating a combination of fields for which network traffic flow information is to be provided, and communicates the dynamic template request message to the exporter.

At step 258, the exporter communicates, to the collector, based on a configured trigger, a data record and data messages comprising the network traffic flow fields as indicated by the dynamic template.

At step 260, the collector receives the data messages as defined by the dynamic template, for use in determining a network traffic flow information or other metrics associated with the computer network environment.

As described above, in accordance with an embodiment, the described approach provides a technical improvement in that only that data describing network traffic flow information which is absolutely required by the dynamic template, needs to be exported by the exporter, and communicated to the collector, which provides savings both in terms of data processing, storage, and bandwidth usage. Each collector can process the data that it exactly needs, with no processing and storing of redundant data.

In accordance with various embodiments, additional advantages of the systems and methods described herein include:

Avoids having to configure pre-defined templates for use with various exporters and/or collectors; which simplifies the management of multiple exporters and multiple collectors in a complex data center, for example one providing a cloud computing environment.

No template configuration is needed on the exporter.

No specific template configuration is required for each collector.

The management of multiple exporters and multiple collectors in a data center can be very much simplified.

Only that network traffic flow information which is absolutely needed will be transferred, providing savings in collector and exporter CPU cycles and network bandwidth.

On the collector, the described approach greatly optimizes bandwidth, storage and compute requirements, as the collector processes the data that it exactly needs; there is no processing and storing of redundant data on the collector.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein enable the collection of network traffic flow information using, for example, the IPFIX protocol, and can incorporate or utilize various features of the IPFIX protocol; other embodiments can be used with other types of network traffic flow information protocols.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A method for use of dynamic templates with a network traffic flow information protocol, comprising:
   at a computer or other electronic device having a processor, operating an exporter, adapted for use with a plurality of collectors, performing an exporting process adapted to communicate network traffic flow information associated with a network environment, to the collectors;
   at one or more computer or other electronic devices, each having a processor and operating as a collector, performing a collecting process adapted to receive the network traffic flow information, from the exporter, wherein each different collector, of the plurality of collectors, has different capabilities, and is adapted to receive data packets exported by the exporter according to the capabilities of the collector;
   wherein a dynamic template configures the exporter, for each particular collector of the plurality of collectors, to send a requested combination of fields for which network traffic flow information is to be provided, until reconfigured by a subsequent dynamic template request message, including that the exporter generates a capability message that indicates network traffic flow fields that can be implemented and exported from the exporter, and communicates the capability message to the collector, wherein the capability message includes a set identifier value that indicates the network traffic flow fields that can be exported by the dynamic template;
   wherein each collector, of the plurality of collectors, upon receipt of the capability message from the exporter,
      examines the network traffic flow fields identified therein,
      determines those types of metrics the collector has the capability to handle,
      generates a dynamic template request message including a set identifier value associated with the collector requesting use of the dynamic template and indicating the combination of fields for which network traffic flow information is to be provided, and
      communicates the dynamic template request message to the exporter, wherein the dynamic template is associated with a template identifier value in a range dedicated for dynamic templates; and
   wherein the exporter communicates, to the collector, data messages comprising only those network traffic flow fields and metrics as indicated by the dynamic template associated with that collector and as determined by its dynamic template request message, for which the collector has the capability or is configured to handle,
   wherein the exporter associates a dynamic template per each different collector, and continues to send the requested combination of fields to that particular collector as specified by its dynamic template, until receipt of a subsequent dynamic template request message from that particular collector,
   wherein receipt of the subsequent dynamic template request message from that particular collector overrides the dynamic template for that particular collector in the exporter.

2. The method of claim 1, wherein the exporter communicates, to the collector, based on a configured trigger, a data record and the data messages comprising the network traffic flow fields as indicated by the dynamic template.

3. The method of claim 1, wherein the collector receives the data messages as defined by the dynamic template, for use in determining a network traffic flow information or other metrics associated with the network environment.

4. The method of claim 1, wherein the network traffic flow information protocol is an Internet Protocol Flow Information Export protocol.

5. The method of claim 1, wherein the network environment is provided as part of a cloud or other computing environment having a plurality of exporters and collectors having different capabilities, and wherein the system uses dynamic templates to provide metrics to each particular collector for which the particular collector has the capability or is configured to handle.

6. The method of claim 1, wherein a dynamic template message per collector is allowed, wherein a subsequent dynamic template request message from the collector overrides the present template for this collector in the exporter;
   wherein a template identifier range of values is dedicated for dynamic templates,
   wherein a template identifier having a value within the range of values is indicative to the collector that the associated template is dynamically generated; and
   wherein during communication of dynamic template data messages from an exporter to a collector, a set identifier value in the set header is used which matches the template identifier used for the dynamic template.

7. A system for use of dynamic templates with a network traffic flow information protocol, comprising:
   a computer or other electronic device having a processor and operating as an exporter, adapted for use with a plurality of collectors, that operates an exporting process adapted to communicate network traffic flow information associated with a network environment, to the collectors;

one or more computer or other electronic devices, each having a processor and operating as a collector, that operates a collecting process adapted to receive the network traffic flow information, from the exporter, wherein each different collector, of the plurality of collectors, has different capabilities, and is adapted to receive data packets exported by the exporter according to the capabilities of the collector;

wherein the exporter generates a capability message that indicates network traffic flow fields that can be implemented and exported from the exporter, and communicates the capability message to the collector, wherein the capability message includes a set identifier value that indicates the network traffic flow fields that can be exported by a dynamic template;

wherein each collector, of the plurality of collectors, upon receipt of the capability message from the exporter,
examines the network traffic flow fields identified therein,
determines those types of metrics the collector has the capability to handle,
generates a dynamic template request message including a set identifier value associated with the collector requesting use of the dynamic template and indicating a combination of fields for which network traffic flow information is to be provided, and
communicates the dynamic template request message to the exporter,
wherein the set identifier value and dynamic template is associated with a template identifier value in a range dedicated for dynamic templates; and wherein the dynamic template configures the exporter, for each particular collector of the plurality of collectors, to send the requested combination of fields for which network traffic flow information is to be provided, until reconfigured by a subsequent dynamic template request message, so that the exporter communicates, to each different collector, data messages comprising only those network traffic flow fields and metrics as indicated by the dynamic template associated with that particular collector and as determined by its dynamic template request message, for which the collector has the capability or is configured to handle, wherein the exporter associates a dynamic template per each different collector and set identifier value, and continues to send the requested combination of fields to that particular collector as specified by its dynamic template, until receipt of a subsequent dynamic template request message from that particular collector, wherein receipt of the subsequent dynamic template request message from that particular collector overrides the dynamic template for that particular collector in the exporter.

8. The system of claim 7, wherein the exporter communicates, to the collector, based on a configured trigger, a data record and the data messages comprising the network traffic flow fields as indicated by the dynamic template.

9. The system of claim 7, wherein the collector receives the data messages as defined by the dynamic template, for use in determining a network traffic flow information or other metrics associated with the network environment.

10. The system of claim 7, wherein the network traffic flow information protocol is an Internet Protocol Flow Information Export protocol.

11. The system of claim 7, wherein the network environment is provided as part of a cloud or other computing environment having a plurality of exporters and collectors having different capabilities, and wherein the system uses dynamic templates to provide metrics to each particular collector for which the particular collector has the capability or is configured to handle.

12. The system of claim 7, wherein a dynamic template message per collector is allowed, wherein a subsequent dynamic template request message from the collector overrides the present template for this collector in the exporter.

13. The system of claim 7, wherein a template identifier range of values is dedicated for dynamic templates,
wherein a template identifier having a value within the range of values is indicative to the collector that the associated template is dynamically generated; and
wherein during communication of dynamic template data messages from an exporter to a collector, a set identifier value in the set header is used which matches the template identifier used for the dynamic template.

14. A non-transitory computer readable storage medium, including instructions stored thereon which when read and executed by at least one of a computer or other electronic device causes the at least one of a computer or other electronic device to perform a method comprising:
operating as at least one of:
an exporter, adapted for use with a plurality of collectors, performing an exporting process adapted to communicate network traffic flow information associated with a network environment, to the collectors; or
the collector, performing a collecting process adapted to receive the network traffic flow information, from the exporter, wherein each different collector, of the plurality of collectors, has different capabilities, and is adapted to receive data packets exported by the exporter according to the capabilities of the collector;

wherein the exporter generates a capability message that indicates network traffic flow fields that can be implemented and exported from the exporter, and communicates the capability message to the collector, wherein the capability message includes a set identifier value that indicates the network traffic flow fields that can be exported by a dynamic template;

wherein each collector, of the plurality of collectors, upon receipt of the capability message from the exporter,
examines the network traffic flow fields identified therein,
determines those types of metrics the collector has the capability to handle,
generates a dynamic template request message including a set identifier value associated with the collector requesting use of the dynamic template and indicating a combination of fields for which network traffic flow information is to be provided, and communicates the dynamic template request message to the exporter, wherein the dynamic template is associated with a template identifier value in a range dedicated for dynamic templates; and wherein the dynamic template configures the exporter, for each particular collector of the plurality of collectors, to send the requested combination of fields for which network traffic flow information is to be provided, until reconfigured by a subsequent dynamic template request message, so that the exporter communicates, to the collector, data messages comprising only those network traffic flow fields and metrics as indicated by the dynamic template associated with that collector and as determined by its dynamic template request message, for which the collector has the capability or is configured to handle, wherein the exporter associates a dynamic template per each different collector, and continues to send the requested combination of fields to that particular collector as specified by its dynamic template, until receipt of a subsequent dynamic template request message from that particular collector, wherein receipt of the subsequent dynamic template request message from that particular collector overrides the dynamic template for that particular collector in the exporter.

15. The non-transitory computer readable storage medium of claim 14, wherein the exporter communicates, to the collector, based on a configured trigger, a data record and the data messages comprising the network traffic flow fields as indicated by the dynamic template.

16. The non-transitory computer readable storage medium of claim 14, wherein the collector receives the data messages as defined by the dynamic template, for use in determining a network traffic flow information or other metrics associated with the network environment.

17. The non-transitory computer readable storage medium of claim 14, wherein the network traffic flow information protocol is an Internet Protocol Flow Information Export protocol.

18. The non-transitory computer readable storage medium of claim 14, wherein the network environment is provided as part of a cloud or other computing environment having a plurality of exporters and collectors having different capabilities, and wherein the system uses dynamic templates to provide metrics to each particular collector for which the particular collector has the capability or is configured to handle.

19. The non-transitory computer readable storage medium of claim 14, wherein a dynamic template message per collector is allowed, wherein a subsequent dynamic template request message from the collector overrides the present template for this collector in the exporter;

wherein a template identifier range of values is dedicated for dynamic templates;

wherein a template identifier having a value within the range of values is indicative to the collector that the associated template is dynamically generated; and wherein during communication of dynamic template data messages from an exporter to a collector, a set identifier value in the set header is used which matches the template identifier used for the dynamic template.

\* \* \* \* \*